(12) United States Patent
Zhao

(10) Patent No.: US 11,433,358 B2
(45) Date of Patent: Sep. 6, 2022

(54) COMPOSITE REVERSE OSMOSIS MEMBRANE AND PREPARATION METHOD THEREOF

(71) Applicant: Jiangsu Bangtech Environmental Sci-Tech Co. LTD, Nantong (CN)

(72) Inventor: Huiyu Zhao, Nantong (CN)

(73) Assignee: Jiangsu Bangtech Environmental Sci-Tech Co. LTD, Nantong (CN)

( * ) Notice: Subject to any disclaimer, the term of this patent is extended or adjusted under 35 U.S.C. 154(b) by 362 days.

(21) Appl. No.: 16/605,311

(22) PCT Filed: Apr. 23, 2018

(86) PCT No.: PCT/CN2018/084075
§ 371 (c)(1),
(2) Date: Oct. 15, 2019

(87) PCT Pub. No.: WO2018/201924
PCT Pub. Date: Nov. 8, 2018

(65) Prior Publication Data
US 2020/0122092 A1  Apr. 23, 2020

(30) Foreign Application Priority Data

May 3, 2017  (CN) .......................... 201710305570.5

(51) Int. Cl.
| | | |
|---|---|---|
| *B01D 69/12* | (2006.01) | |
| *B01D 61/02* | (2006.01) | |
| *B01D 67/00* | (2006.01) | |
| *B01D 69/02* | (2006.01) | |
| *B01D 69/10* | (2006.01) | |
| *B01D 71/56* | (2006.01) | |

(52) U.S. Cl.
CPC ........... *B01D 69/12* (2013.01); *B01D 61/025* (2013.01); *B01D 67/0011* (2013.01); *B01D 69/02* (2013.01); *B01D 69/105* (2013.01); *B01D 71/56* (2013.01); *B01D 2325/22* (2013.01); *B01D 2325/24* (2013.01); *B01D 2325/36* (2013.01); *B01D 2325/48* (2013.01)

(58) Field of Classification Search
CPC .. B01D 69/12; B01D 61/025; B01D 67/0011; B01D 69/02; B01D 69/105; B01D 71/56; B01D 2325/22; B01D 2325/24; B01D 2325/36; B01D 2325/48; B01D 2323/40; B01D 67/0006; B01D 69/125; B01D 71/021; B01D 71/32; B01D 71/38; B01D 71/52; B01D 69/10; B01D 71/82
See application file for complete search history.

(56) References Cited

U.S. PATENT DOCUMENTS

| | | | |
|---|---|---|---|
| 2007/0256969 A1* | 11/2007 | Ding ...................... | B01D 71/32 210/490 |
| 2011/0120307 A1* | 5/2011 | Ding ...................... | B01D 71/32 521/77 |

* cited by examiner

*Primary Examiner* — Bradley R Spies
*Assistant Examiner* — Jeannie McDermott
(74) *Attorney, Agent, or Firm* — Dragon Sun Law Firm, PC; Jinggao Li, Esq.; Nathaniel Perkins

(57) ABSTRACT

The present application discloses a composite reverse osmosis membrane and a preparation method thereof. The method includes: uniformly mixing fluorine-containing polyaryletherketone of a certain concentration and silane-modified polyaryletherketone as a casting solution; coating a nonwoven fabric, i.e., a substrate, with the casting solution to form a support layer; then coating the surface of the support layer with a solution A and a solution B sequentially for reaction to form a polyamide desalination layer; and coating the polyamide desalination layer with a modified polyvinyl alcohol anti-pollution layer. By means of the method, the composite reverse osmosis membrane is prepared. Compared with the prior art, the present application can prepare a composite reverse osmosis membrane with high temperature resistance and high strength by using the composite modified polyaryletherketone as the support layer, and moreover, uses polyvinyl alcohol as a component of the anti-pollution layer, and has good anti-pollution properties.

10 Claims, No Drawings

COMPOSITE REVERSE OSMOSIS MEMBRANE AND PREPARATION METHOD THEREOF

REFERENCE TO RELATED APPLICATIONS

This application claims the benefits of the filing dates of Chinese patent application Serial No. 201710305570.5 filed on May 3, 2017 and PCT Patent Application Ser. No. PCT/CN2018/084075 filed on Apr. 23, 2018, entitled "COMPOSITE REVERSE OSMOSIS MEMBRANE AND PREPARATION METHOD THEREOF". The teachings of the entire referenced applications are incorporated herein by reference.

TECHNICAL FIELD

The present application belongs to the technical field of water-treatment membrane separations, and relates to a composite reverse osmosis membrane and a preparation method thereof, and in particular, to a high-flux composite reverse osmosis membrane and a preparation method thereof.

BACKGROUND

Reverse osmosis technology is a membrane separation technology that intercepts solutes in a solution with a semi-permeable membrane by using the pressure as the driving force. Compared with the common filtration technology, reverse osmosis has the advantages of simple operation process, high removal efficiency and environmental friendliness, and is widely used in seawater and brackish desalination, hard water softening, reclaimed water recycling, industrial wastewater treatment, ultrapure water preparation and other fields. The composite membrane is the fastest growing and most widely used membrane because it can optimize the membrane rejection, water flux, stability and other properties. More than 90% of the nanofiltration and reverse osmosis membranes currently available on the market are composite membranes. The composite membrane refers to compositing a thin and dense layer of different materials having a special separation function on a porous support base membrane. Compared with the integrated membrane, the composite membrane has a thinner surface dense layer, and thus the membrane has a high solute separation rate and water penetration rate at the same time, and an optimized physical and chemical structure, and can satisfy different selective separation demands.

The first commercialized reverse osmosis membrane is prepared from modified cellulose acetate. The reverse osmosis membrane produced has relatively low water flux and salt rejection rate, and good chlorine resistance. After the process optimization, the salt rejection rate is improved. However, the water flux is still relatively low, and thus the application is very limited. The composite reverse osmosis membrane based on the polyamide structure is then commercialized, and is quickly widely applied as the most used reverse osmosis membrane because of its high flux, high desalination and low energy consumption. The common preparation method of the existing composite reverse osmosis membrane includes two steps: step I, coating a PET non-woven fabric with a layer of polymer material as a porous support layer; and step II, carrying out an interfacial polycondensation reaction on the support layer to generate a polyamide three-dimensional cross-linked structure to form a desalination functional layer. Although the existing composite reverse osmosis membrane has higher water flux and salt rejection rate, the total thickness of the composite reverse osmosis membrane is 140 micrometers or even thicker due to the specific three-layer composite structure. It is not conducive to a reverse osmosis assembly to further save space, and it is difficult to increase the effective membrane area per unit volume, which is the main constraint factor for component design optimization.

Although the reverse osmosis membrane has currently been used on a large scale, there are still many problems, such as poor high-temperature resistance. The general reverse osmosis membrane does not have high temperature resistance, because water in many places in industrial filtration has higher temperature than the room temperature, or even 50 degrees or more. Under such a condition, the damage to the reverse osmosis membrane is huge, and the operation of the membrane at high temperature will accelerate its aging, and moreover, the strength of the membrane will be greatly reduced. If the temperature exceeds the operating temperature of the membrane, the performance of the reverse osmosis membrane will decrease rapidly, and it will not work properly in severe cases. Therefore, improving the high temperature resistance of the reverse osmosis membrane is also an urgent problem to be solved. At present, there are many methods for improving the reverse osmosis membrane, such as increasing the membrane thickness, improving the high temperature resistance of the support by adding additives, and modifying the support material. Although some effects have been obtained, it is still unable to meet the requirements of various situations.

In addition, as a type of filtration membrane, the reverse osmosis membrane has been one of the concerns of its service life and water-passing performance. Since many composite reverse osmosis membranes are of a multi-layered structure, although the desalination performance is improved, the water flux is reduced due to the accumulation of dirt after use for a long time, and thus the reverse osmosis efficiency is lowered. Moreover, doping the membrane material with a hydrophilic material can increase the water flux of the reverse osmosis membrane, such as modification by means of a hydrophilic group. Moreover, in recent years, graphene and modified graphene have emerged as a new material in people's eyes. Graphene is an atomic crystal formed by sp2 hybridization of carbon atoms and having a two-dimensional honeycomb structure with a single atomic layer. In graphene, in addition to a peroxy bond that simply introduces oxygen atoms, other functional groups exist in the structure, such as carbonyl ($=CO$), hydroxyl ($—OH$), and phenolic hydroxyl groups, so that graphene has high hydrophilcity and excellent antibacterial activity. The applicant of the present application finds through experiments that both graphene and modified graphene have good hydrophilic properties, and doping the graphene and modified graphene into the reverse osmosis membrane and the filtration membrane unexpectedly enhances the water flux effect.

The present application is directed to solving the problems of poor high-temperature resistance, short service life, low water flux and the like of the reverse osmosis membrane in the prior art, so as to provide a composite reverse osmosis membrane capable of enhancing the high temperature resistance, long service life and high water flux and a preparation method thereof.

SUMMARY OF THE INVENTION

The objective of the present application is to provide a composite reverse osmosis membrane and a preparation method thereof.

The composite reverse osmosis membrane proposed in the present application includes a support body layer, a functional membrane layer, and an anti-pollution layer, where the support body layer is a mixture of fluorine-containing polyaryletherketone and silane-modified polyaryletherketone, and the functional membrane layer is a polyamide layer.

Further, the anti-pollution layer is a modified polyvinyl alcohol layer.

Further, the fluorine-containing polyaryletherketone is trifluoromethylalkyl polyaryletherketone or difluoromethylalkyl polyaryletherketone.

Further, the silane-modified polyaryletherketone is trimethylsilane, triethylsilane, or tripropylsilane-modified polyaryletherketone.

Further, the fluorine-containing polyaryletherketone and the silane-modified polyaryletherketone have a mass ratio of 1:3 to 3:1.

Further, the functional membrane layer is further doped with a graphene oxide, and the doping amount of the graphene oxide is 0.01-0.1%, preferably 0.02-0.05%, of the mass content of the membrane layer.

Further, the thickness of the support body layer is 10-100 μm, the thickness of the polyamide layer is 50-500 nm, and the thickness of the modified polyvinyl alcohol layer is 10-100 μm.

The present application also provides a preparation method of the composite reverse osmosis membrane, specifically as follows:

1) preparing fluorine-containing polyaryletherketone, silane-modified polyaryletherketone, and an organic solvent into a casting solution according to a certain ratio, uniformly stirring, standing for 1-3 hour, and then carrying out ultrasonic degassing for 10-30 min to obtain a support casting solution;

2) coating a non-woven fabric with the casting solution prepared in step 1) to the thickness of 10-150 μm by means of a membrane scraping machine, evaporating at room temperature for 5-30 seconds and then immersing in 15-25° C. ultra-pure water for gel solidification to form a membrane, and drying in an oven at 50-80° C. for 4-8 hours to obtain a support body layer;

3) preparing a solution A and a solution B, respectively, where a solute of the solution A is aromatic amine and/or fatty amine, and a solvent is water; and a solute of the solution B is aromatic acyl chloride and/or fatty acyl chloride, and a solvent is an organic solvent;

4) first immersing the surface of the support body layer prepared in step 2) in the solution A for 5-30 seconds, then standing at the room temperature for 5-30 seconds; immersing in the solution B for 5-30 seconds, and then standing at the room temperature for 1-10 min; and drying in a drying oven at 40-60° C. for 2-6 hours; and 5) coating the surface of the composite membrane layer prepared in step 4) with a solution of modified polyvinyl alcohol and ionic liquid to the thickness of 30-80 μm, and dying in the drying oven at 40-80° C. for 2-6 hours to prepare a composite reverse osmosis membrane.

Further, the fluorine-containing polyaryletherketone is trifluoromethylalkyl polyaryletherketone or difluoromethylalkyl polyaryletherketone, and the silane-modified polyaryletherketone is trimethylsilane, triethylsilane, or tripropylsilane-modified poly aryletherketone.

Further, the fluorine-containing polyaryletherketone and the silane-modified polyaryletherketone in step 1 have a mass ratio of 1:3 to 3:1.

Further, a graphene oxide is added to the solvent A, and the additive amount is 0.01-0.1%, preferably 0.02-0.05%, of the total amount of the solutes in the solutions A and B.

Further, the aromatic amine is at least one of p-phenylenediamine, m-phenylenediamine, trimestriamine, 4,4'-diaminodiphenyl ether, 3,5-diaminobenzoic acid, or 1,2,4-triaminobenzene, and the fatty amine is at least one of ethylenediamine, propylenediamine, butanediamine, pentamethylenediamine, tris(2-aminoethyl)amine, diethylenetriamine, N-(2-hydroxyethyl)ethylenediamine, hexamethylenediamine, 1,3-diaminocyclohexane, 1,2-diaminocyclohexane, 1,4-diaminocyclohexane, piperazine, 1,3-bispiperidinylpropane, or 4-aminomethylpiperazine;

the aromatic acyl chloride is at least one of benzoyl chloride, m-phthaloyl chloride, o-phthaloyl chloride, diphenyl chloride, benzene disulfonyl chloride, 1,2,4-trichloric anhydride chloride, or trimesoyl chloride; and the fatty acyl chloride is at least one of butyryl chloride, succinyl chloride, valeryl chloride, glutaryl chloride, tricarboxylic chloride, adipoyl chloride, sebacoyl dichloride, decanoyl chloride, cyclopropane trichloride, cyclobutane dichloride, cyclobutane tetrachloride, cyclopentane dichloride, cyclopentane trichloride, cyclopentane tetrachloride, cyclohexanedichloride, cyclohexanetrichloride, cyclohexanetetrayl chloride, tetrahydrofuran dichloride, or tetrahydrofuran tetrachloride.

Further, the organic solvent in step 1) is: trichloromethane, dichloromethane, dimethylsulfoxide, Dimethylformamide (DMF), or Dimethylacetamide (DMAc).

Further, the organic solvent in step 3) is one or more of aliphatic hydrocarbon, cycloaliphatic hydrocarbon, and aromatic hydrocarbon having 4 to 10 carbon atoms.

Further, the support body layer has a pore diameter of 0-200 nm, preferably 5-100 nm, and more preferably 15-50 nm.

Further, the support body layer is immersed in the solution A for 10-20 seconds and the support body layer is immersed in the solution B for 10-20 seconds.

Further, the ionic liquid is N-methylpyrrolidone or a carboxyimidazoles ionic liquid.

Further, the pore-foaming agent is any one or a mixture of polyvinyl alcohol, polyethylene glycol, polyvinyl pyrrolidone, ethylene glycol monomethyl ether, and ethylene glycol dimethyl ether, and the concentration is 1-20% wt.

The present application mainly has the following significant effects.

The present application adopts a fluorine-containing polyaryletherketone support layer and a silane-modified polyaryletherketone as host materials, that is, a composite modified polyaryletherketone is adopted, where the thermal stability and solubility of the fluorine-modified polyaryletherketone can be improved due to the small atomic radius and high negative potential energy of the fluorine atoms. Moreover, in the presence of silicyl which has high stability and chemical equilibrium properties, silane-modified polyaryletherketone has higher thermal stability and high temperature resistance and strength. The fluorine-containing polyaryletherketone support layer and the silane-modified polyaryletherketone have good heat resistance when used alone. Moreover, it is found through experiments that when the fluorine-containing polyaryletherketone which also has high temperature resistance is used in combination with the silane-modified polyaryletherketoneare, the heat resistance and strength of the fluorine-containing polyaryletherketone are significantly improved. It is considered through analysis that silicon atoms of the silane group form a network structure and then are intersected with the fluorine atoms to form a more stable spatial structure, and the structural strength can be strengthened by means of the interatomic force.

In addition, the graphene oxide itself is a high-strength and high-temperature resistant material, and the surface of the graphene oxide has many active hydroxyl and other groups, and has good hydrophilicity. The graphene oxide is added to a casting material and can be organically bonded to a membrane-forming polymer in the membrane forming process, so as to further strengthen the strength, high temperature resistance and water flux of the reverse osmosis membrane. By means of the antibacterial property of the outer modified polyethylene glycol, the biological pollution of the reverse osmosis membrane can be avoided, and the service life of the reverse osmosis membrane can be prolonged.

DETAILED DESCRIPTION

In order to better understand the present application, the contents of the present application are further clarified below with reference to embodiments. The contents of the present application are not limited to the following embodiments.

Embodiment 1

A composite reverse osmosis membrane containing 10% fluorine-containing polyaryletherketone and 8% silane-modified polyaryletherketone is prepared in the following specific steps:

1) preparing trifluoromethylalkyl polyaryletherketone, trimethylsilyl polyaryletherketone, DMF, and polyvinylpyrrolidone into a casting solution in a weight ratio of 10:8:68:14, uniformly stirring, standing for 30 min and then carrying out ultrasonic degassing for 8 min to obtain a support body layer casting solution;

2) coating a non-woven fabric with the casting solution prepared in step 1) to the thickness of 60 μm by means of a membrane scraping machine, then evaporating at room temperature for 10 seconds and then immersing in 20° C. deionized water for gel solidification to form a membrane, and drying in an oven at 50° C. for 6 hours to obtain a support body layer;

3) respectively preparing a solution A, where a solute is p-diphenylamine, a solvent is water, and the concentration is 5% wt; and preparing a solution B, where a solute is tetrahydrofuran dichloride, a solvent is methylbenzene, and the concentration is 5% wt;

4) first immersing the surface of the support body layer prepared in step 2) in the solution A for 20 seconds, then standing at the room temperature for 15 seconds; then immersing in the solution B for 20 seconds, and then standing at the room temperature for 8 min; and drying in a drying oven at 50° C. for 3 hours; and 5) preparing an aqueous solution containing 15% polyvinyl alcohol and 5% N-methylpyrrolidone, coating the surface of the composite membrane layer prepared in step 4) with the aqueous solution to the thickness of 50 μm, and drying in the drying oven at 60° C. for 4 hours to obtain the composite reverse osmosis membrane.

The base membrane thickness of the support layer of the prepared composite reverse osmosis membrane is 60 μm, the desalination layer is 35 μm, the anti-pollution layer of 50 μm, and an average pore diameter of the support layer is 30-60 nm.

Embodiment 2

A composite reverse osmosis membrane containing 10% fluorine-containing polyaryletherketone and 10% silane-modified polyaryletherketone with the desalination layer doped with 0.03% graphene oxide is prepared in the following specific steps:

1) preparing difluoromethylalkyl polyaryletherketone, triethylsilyl polyaryletherketone, DMAc, and polyethylene glycol into a casting solution in a ratio of 10:10:68:12, uniformly stirring, standing for 45 min and then carrying out ultrasonic degassing for 20 min to obtain a support body layer casting solution;

2) coating a non-woven fabric with the casting solution prepared in step 1) to the thickness of 90 μm by means of a membrane scraping machine, then evaporating at room temperature for 10 seconds and then immersing in 25° C. deionized water for gel solidification to form a membrane, and drying in an oven at 60° C. for 4 hours to obtain a support body layer;

3) respectively preparing a solution A, where a solute is 3,5-diaminobenzoic acid, a solvent is water, the concentration is 8% wt, and 0.03% wt graphene oxide is doped; and preparing a solution B, where a solute is cyclopropane trichloride, a solvent is n-hexane, the concentration is 8% wt, and 0.03% wt graphene oxide is doped;

4) first immersing the surface of the support body layer prepared in step 2) in the solution A for 15 seconds, then standing at the room temperature for 15 seconds; then immersing in the solution B for 20 seconds, and then standing at the room temperature for 5 min; and drying in a drying oven at 50° C. for 2 hours; and 5) preparing an aqueous solution containing 12% polyvinyl alcohol and 8% N-methylpyrrolidone, coating the surface of the composite membrane layer prepared in step 4) with the aqueous solution to the thickness of 50 μm, and drying in the drying oven at 60° C. for 4 hours to obtain the composite reverse osmosis membrane.

The base membrane thickness of the support layer of the prepared composite reverse osmosis membrane is 90 μm, the desalination layer is 40 μm, the anti-pollution layer of 50 μm, and an average pore diameter of the support layer is 30-60 nm.

Embodiment 3

A composite reverse osmosis membrane containing 5% fluorine-containing polyaryletherketone and 15% silane-modified polyaryletherketone with the desalination layer doped with 0.05% graphene oxide is prepared in the following specific steps:

1) preparing trifluoromethane-modified polyaryletherketone, tripropylsilane-modified polyaryletherketone, DMF, and polyethylene glycol into a casting solution in a ratio of 5:15:65:15, uniformly stirring, standing for 1 hour and then carrying out ultrasonic degassing for 15 min to obtain a support body layer casting solution;

2) coating a non-woven fabric with the casting solution prepared in step 1) to the thickness of 100 μm by means of a membrane scraping machine, then evaporating at room temperature for 15 seconds and then immersing in 20° C. deionized water for gel solidification to form a membrane, and drying in an oven at 55° C. for 3 hours to obtain a support body layer;

3) respectively preparing a solution A, where a solute is hexamethylenediamine, the concentration is 8% wt, a solvent is water, and 0.05% graphene oxide is added, and preparing a solution B, where a solute is tetrahydrofuran tetrachloride, a solvent is n-pentane, the concentration is 8% wt, and 0.05% wt graphene oxide is added;

4) first immersing the surface of the support body layer prepared in step 2) in the solution A for 15 seconds, then standing at the room temperature for 8 seconds; then immersing in the solution B for 20 seconds, and then standing at the room temperature for 5 min; and drying in a drying oven at 45° C. for 4 hours; and 5) preparing an aqueous solution containing 12% polyvinyl alcohol and 6% N-methylpyrrolidone, coating the surface of the composite membrane layer prepared in step 4) with the aqueous solution to the thickness of 50 μm, and drying in the drying oven at 60° C. for 4 hours to obtain the composite reverse osmosis membrane.

The base membrane thickness of the support layer of the prepared composite reverse osmosis membrane is 100 μm, the desalination layer is 50 μm, the anti-pollution layer of 50 μm, and an average pore diameter of the support layer is 30-80 nm.

Comparative Example

A composite reverse osmosis membrane with a base membrane of 18% polysulfone is prepared in the following specific steps:

1) preparing an aqueous solution containing 18% wt polysulfone resin and a solvent N-methylpyrrolidone at a ratio, and stirring at 60° C. for 5 hours to prepare a uniformly dispersed casting solution; uniformly coating a non-woven fabric with the filtered and degassed casting solution by means of a membrane scraping machine to the wet-membrane thickness of 120 μm, standing at room temperature for 5 seconds, and then immersing in 25° C. deionized water gel solidification to form a membrane, and drying the membrane in an oven at 60° C. to obtain a base membrane;

2) respectively preparing a solution A, where a solute is 1,4-diaminocyclohexane, a solvent is n-hexane, and the concentration is 6% wt; and preparing a solution B, where a solute is trimesoyl chloride, a solvent is n-hexane, and the concentration is 5% wt;

4) first immersing the surface of the support body layer prepared in step 2) in the solution A for 15 seconds, then standing at the room temperature for 5 seconds; then immersing in the solution B for 20 seconds, and then standing at the room temperature for 5 min; and drying in a drying oven at 50° C. for 2.5 hours; and 5) preparing an aqueous solution containing 12% polyvinyl alcohol and 6% N-methylpyrrolidone, coating the surface of the composite membrane layer prepared in step 4) with the aqueous solution to the thickness of 50 μm, airing at room temperature, and rinsing three times with deionized water, and drying in the drying oven at 60° C. for 4 hours to obtain the composite reverse osmosis membrane.

The base membrane thickness of the support layer of the prepared composite reverse osmosis membrane is 120 μm, the desalination layer is 40 μm, the anti-pollution layer of 50 μm, and an average pore diameter of the support layer is 40-100 nm.

Embodiment 4

Test Experiment

The composite reverse osmosis membranes prepared in Embodiments 1-3 and the comparative example are subjected to a reverse osmosis operation experiment at a higher temperature, and the corresponding permeation flow rate (GFD), salt rejection rate (REJ), and water flux are tested.

The test initial conditions: the salt content of raw water (NaCL) is 1500 PPM, the raw water temperature is 25° C., and the operating pressure is 150 PSI.

High temperature test conditions: the salt content of raw water (NaCL) is 1500 PPM, the raw water temperature is 40° C., and the operating pressure is 150 PSI.

TABLE 1

| | | GFD, REJ and water flux of the membrane | | | |
|---|---|---|---|---|---|
| | | 25° C. initial data | Operating at 40° C. for 24 h | Operating at 40° C. for 48 h | Operating at 40° C. for 72 h |
| Comparative example | GFD | 31 | 40 | 38 | 24 |
| | REJ/% | 99.6 | 97.1 | 96.4 | 95 |
| | Pure water flux (L/m²*h) | 52.6 | 67.9 | 64.5 | 40.7 |
| Embodiment 1 | GFD | 36.2 | 44 | 43 | 41 |
| | REJ/% | 99.57 | 99.53 | 99.52 | 99.50 |
| | Pure water flux (L/m²*h) | 61.4 | 74.7 | 73.0 | 69.5 |
| Embodiment 2 | GFD | 32.4 | 38 | 38.9 | 37.5 |
| | REJ/% | 99.88 | 99.80 | 99.78 | 99.79 |
| | Pure water flux (L/m²*h) | 55.0 | 64.5 | 66.0 | 63.6 |
| Embodiment 3 | GFD | 31.2 | 37.5 | 36.8 | 36.4 |
| | REJ/% | 99.86 | 99.85 | 99.85 | 99.82 |
| | Pure water flux (L/m²*h) | 52.9 | 63.7 | 62.4 | 61.7 |

It can be obviously seen from the above test results that the composite reverse osmosis membranes of Embodiments 1-3 of the present application has good high temperature resistance, high water flux, stable salt rejection rate and permeation flow rate, and the reverse osmosis membranes are stable in performance at high temperature and has a long service life, which depends on the use of fluorine-containing polyaryletherketone and silane-modified polyaryletherketone-based membrane materials of improved performance and the graphene oxide component of enhanced heat resistance and water permeability is doped.

As stated above, the foregoing embodiments are merely used to explain the technical solutions of the present application, and are not limited thereto. Although the present application has been described in detail with reference to the foregoing embodiments, those skilled in the art should understand that the technical solutions described in the foregoing embodiments can still be modified, or equivalent substitutions can be made to some of the technical features. Moreover, these modifications or substitutions do not make the essences of corresponding technical solutions depart from the spirit and scope of the technical solutions of the embodiments of the present application.

The invention claimed is:

1. A composite reverse osmosis membrane, comprising a support body layer, a functional membrane layer, and an anti-pollution layer, wherein the support body layer is a mixture of fluorine-containing polyaryletherketone and silane-modified polyaryletherketone, the functional membrane layer is a polyamide layer, and the anti-pollution layer is a modified polyvinyl alcohol layer.

2. The composite reverse osmosis membrane according to claim 1, wherein the fluorine-containing polyaryletherketone is trifluoromethylalkyl polyaryletherketone or difluoromethylalkyl polyaryletherketone; and the silane-modified polyaryletherketone is trimethylsilane, triethylsilane, or tripropylsilane-modified polyaryletherketone.

3. The composite reverse osmosis membrane according to claim 1, wherein the fluorine-containing polyaryletherketone and the silane-modified polyaryletherketone have a mass ratio of 1:3 to 3:1.

4. The composite reverse osmosis membrane according to claim 1, wherein the functional membrane layer is further doped with a graphene oxide, and the doping amount of the graphene oxide is 0.01-0.1% of the mass content of the functional membrane layer.

5. The composite reverse osmosis membrane according to claim 1, wherein the thickness of the support body layer is 10-100 μm; the thickness of the polyamide layer is 50-500 nm, and the thickness of the modified polyvinyl alcohol layer is 10-100 μm.

6. A preparation method of a composite reverse osmosis membrane which is comprising a support body layer, a functional membrane layer, and an anti-pollution layer, wherein the support body layer is a mixture of fluorine-containing polyaryletherketone and silane-modified polyaryletherketone, the functional membrane layer is a polyamide layer, and the anti-pollution layer is a modified polyvinyl alcohol layer, the preparation method comprising:
preparing fluorine-containing polyaryletherketone, silane-modified polyaryletherketone, and an organic solvent into a casting solution according to a certain ratio, uniformly stirring, standing for 1-3 hour, and then carrying out ultrasonic degassing for 10-30 min to obtain a support casting solution;
coating a non-woven fabric with the casting solution prepared in step 1) to a thickness of 10-150 μm by means of a membrane scraping machine, evaporating at room temperature for 5-30 seconds and then immersing in 15-25° C. ultra-pure water for gel solidification to form a membrane, and drying in an oven at 50-80° C. for 4-8 hours to obtain a support body layer;
preparing a solution A and a solution B, respectively, wherein a solute of the solution A is aromatic amine and/or fatty amine, and a solvent is water; and a solute of the solution B is aromatic acyl chloride and/or fatty acyl chloride, and a solvent is an organic solvent;
first immersing a surface of the support body layer prepared in step 2) in the solution A for 5-30 seconds, then standing at the room temperature for 5-30 seconds; immersing in the solution B for 5-30 seconds, and then standing at the room temperature for 1-10 min; and drying in a drying oven at 40-60° C. for 2-6 hours; and
coating the surface of the composite membrane layer prepared in step 4) with a solution of modified polyvinyl alcohol and ionic liquid to a thickness of 30-80 μm, and dying in the drying oven at 40-80° C. for 2-6 hours to prepare a composite reverse osmosis membrane.

7. The preparation method according to claim 6, wherein the fluorine-containing polyaryletherketone is trifluoromethylalkyl polyaryletherketone or difluoromethylalkyl polyaryletherketone; and the silane-modified polyaryletherketone is trimethylsilane, triethylsilane, or tripropylsilane-modified polyaryletherketone.

8. The preparation method according to claim 6, wherein the fluorine-containing polyaryletherketone and the silane-modified polyaryletherketone in step 1) have a mass ratio of 1:3 to 3:1.

9. The preparation method according to claim 6, wherein a graphene oxide is also added to the solvent A, and the additive amount is 0.01-0.1% of the total amount of the solutes in the solutions A and B.

10. The preparation method according to claim 6, wherein the aromatic amine is at least one of p-phenylenediamine, m-phenylenediamine, trimestriamine, 4,4'-diaminodiphenyl ether, 3,5-diaminobenzoic acid, or 1,2,4-triaminobenzene; and the fatty amine is at least one of ethylenediamine, propylenediamine, butanediamine, pentamethylenediamine, tris(2-aminoethyl)amine, diethylenetriamine, N-(2-hydroxyethyl)ethylenedi amine, hexamethylenediamine, 1,3-diaminocyclohexane, 1,2-diaminocyclohexane, 1,4-diaminocyclohexane, piperazine, 1,3-bispiperidinylpropane, or 4-aminomethylpiperazine; wherein the aromatic acyl chloride is at least one of benzoyl chloride, m-phthaloyl chloride, o-phthaloyl chloride, diphenyl chloride, benzene disulfonyl chloride, 1,2,4-trichloric anhydride chloride, or trimesoyl chloride; and the fatty acyl chloride is at least one of butyryl chloride, succinyl chloride, valeryl chloride, glutaryl chloride, tricarboxylic chloride, adipoyl chloride, sebacoyl dichloride, decanoyl chloride, cyclopropane trichloride, cyclobutane dichloride, cyclobutane tetrachloride, cyclopentane dichloride, cyclopentane trichloride, cyclopentane tetrachloride, cyclohexanedichloride, cyclohexanetrichloride, cyclohexanetetrayl chloride, tetrahydrofuran dichloride, or tetrahydrofuran tetrachloride.

* * * * *